(12) United States Patent
Terwilliger et al.

(10) Patent No.: US 11,753,993 B1
(45) Date of Patent: Sep. 12, 2023

(54) TURBINE ENGINE WITH MASS REJECTION

(71) Applicant: Raytheon Technologies Corporation, Farmington, CT (US)

(72) Inventors: Neil J. Terwilliger, Cheshire, CT (US); Joseph E. Turney, Amston, CT (US); Joseph B. Staubach, Colchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 17/669,632

(22) Filed: Feb. 11, 2022

(51) Int. Cl.
*F02C 7/14* (2006.01)
*F02C 6/00* (2006.01)
*F02C 7/224* (2006.01)
*F02C 7/141* (2006.01)
*F02C 3/22* (2006.01)
*F02C 3/30* (2006.01)
*F02C 7/18* (2006.01)

(52) U.S. Cl.
CPC .............. *F02C 7/14* (2013.01); *F02C 3/22* (2013.01); *F02C 3/30* (2013.01); *F02C 6/006* (2013.01); *F02C 7/141* (2013.01); *F02C 7/18* (2013.01); *F02C 7/224* (2013.01); *F05D 2220/323* (2013.01); *F05D 2240/35* (2013.01); *F05D 2260/207* (2013.01); *F05D 2260/213* (2013.01); *F05D 2260/232* (2013.01)

(58) Field of Classification Search
CPC .... F02C 3/22; F02C 6/006; F02C 7/14; F02C 7/141; F02C 7/224; F05D 2240/36
See application file for complete search history.

(56) References Cited

U.S. PATENT DOCUMENTS

| 10,934,894 B2 | 3/2021 | Copeland et al. |
| 2017/0292411 A1* | 10/2017 | Bauer ................. F01K 23/02 |
| 2020/0318498 A1 | 10/2020 | Goodarzi |
| 2021/0207500 A1* | 7/2021 | Klingels ............. F01K 23/10 |

FOREIGN PATENT DOCUMENTS

| EP | 1039115 A2 | 9/2000 |
| EP | 3048281 A1 | 7/2016 |
| GB | 1557817 A | 12/1979 |

OTHER PUBLICATIONS

European Search Report for European Application No. 23156406.3; dated Jul. 7, 2023; 7 pages.
Najjar, "The Over-Expansion Gas Turbine Cycle Using Hydrogen", Int. J. Hydrogen Energy, vol. 16, No. 9, pp. 625-629, 1991.

* cited by examiner

*Primary Examiner* — Scott J Walthour
(74) *Attorney, Agent, or Firm* — CANTOR COLBURN LLP

(57) ABSTRACT

Aircraft engines include a turbine engine comprising a compressor section, a burner section, and a turbine section arranged along a shaft, with a core flow path through the turbine engine such that exhaust from the burner section passes through the turbine section, a condensing assembly arranged downstream of the turbine section of the turbine engine along the core flow path, and an exhaust compressor arranged downstream of the condensing assembly along the core flow path. The condensing assembly is configured to reduce a mass flow of the exhaust compressor by condensing water vapor from the core flow and removing liquid water from the core flow.

20 Claims, 7 Drawing Sheets

TURBINE ENGINE WITH MASS REJECTION

TECHNICAL FIELD

The present disclosure relates generally to turbine engines and aircraft engines, and more specifically to aircraft engines that may include water/steam capture and mass rejection from a core flow.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, hydrocarbon-based fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF SUMMARY

According to some embodiments, aircraft engines are provided. The aircraft engines include a turbine engine comprising a compressor section, a burner section, and a turbine section arranged along a shaft, with a core flow path through the turbine engine such that exhaust from the burner section passes through the turbine section, a condensing assembly arranged downstream of the turbine section of the turbine engine along the core flow path, and an exhaust compressor arranged downstream of the condensing assembly along the core flow path. The condensing assembly is configured to reduce a mass flow of the exhaust compressor by condensing water vapor from the core flow and removing liquid water from the core flow.

In addition to one or more of the features described above, or as an alternative, embodiments of the aircraft engines may include that the burner section is configured to combust hydrogen fuel therein.

In addition to one or more of the features described above, or as an alternative, embodiments of the aircraft engines may include that a fuel flow path of the hydrogen fuel passes through the condensing assembly prior to injection of the hydrogen into the burner section.

In addition to one or more of the features described above, or as an alternative, embodiments of the aircraft engines may include that the condensing assembly comprises a condensing turbine.

In addition to one or more of the features described above, or as an alternative, embodiments of the aircraft engines may include that the condensing assembly comprises a heat exchange condenser.

In addition to one or more of the features described above, or as an alternative, embodiments of the aircraft engines may include that the condensed water vapor is stored in a water storage.

In addition to one or more of the features described above, or as an alternative, embodiments of the aircraft engines may include a water pump configured to pump water from the water storage to at least one of the burner section or the turbine section of the turbine engine.

In addition to one or more of the features described above, or as an alternative, embodiments of the aircraft engines may include at least one valve configured to selectively direct a portion of the condensed water vapor into the burner section or the turbine section as liquid water or steam.

In addition to one or more of the features described above, or as an alternative, embodiments of the aircraft engines may include an evaporator arranged downstream from the turbine section along the core flow path.

In addition to one or more of the features described above, or as an alternative, embodiments of the aircraft engines may include that the condensed water vapor is directed through the evaporator to generate steam.

In addition to one or more of the features described above, or as an alternative, embodiments of the aircraft engines may include that the steam is injected into at least one of the burner section and the turbine section of the turbine engine.

In addition to one or more of the features described above, or as an alternative, embodiments of the aircraft engines may include a fan and a bypass duct configured to direct bypass air past the compressor section, the burner section, and the turbine section.

In addition to one or more of the features described above, or as an alternative, embodiments of the aircraft engines may include that the bypass air is directed through a portion of the condensing assembly to cause condensing of water from an exhaust from the burner section.

In addition to one or more of the features described above, or as an alternative, embodiments of the aircraft engines may include that the condensing assembly comprises (i) a combustor exhaust-to-air heat exchanger and (ii) a combustor exhaust-to-fuel heat exchanger.

In addition to one or more of the features described above, or as an alternative, embodiments of the aircraft engines may include a water separator arranged downstream from the condensing assembly.

In addition to one or more of the features described above, or as an alternative, embodiments of the aircraft engines may include that the exhaust compressor is operated at sub-ambient pressures.

In addition to one or more of the features described above, or as an alternative, embodiments of the aircraft engines may include a Rankine bottoming cycle having a Rankine turbine, wherein at least a portion of the condensed water vapor is directed through the Rankine turbine.

In addition to one or more of the features described above, or as an alternative, embodiments of the aircraft engines may include that the condensing assembly comprises three cooling flow paths comprising: (i) a cooling air flow path, (ii) an oxygen fuel flow path, and (iii) a hydrogen fuel flow path.

In addition to one or more of the features described above, or as an alternative, embodiments of the aircraft engines may include that an exhaust from the burner section passes through the condensing assembly to sequentially thermally interact with the cooling air flow path, then the oxygen fuel flow path, and then the hydrogen fuel flow path to condense water from the exhaust of the burner section.

In addition to one or more of the features described above, or as an alternative, embodiments of the aircraft engines may include that the condensing assembly is configured to extract up to 100% of the water content from an exhaust from the burner section.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
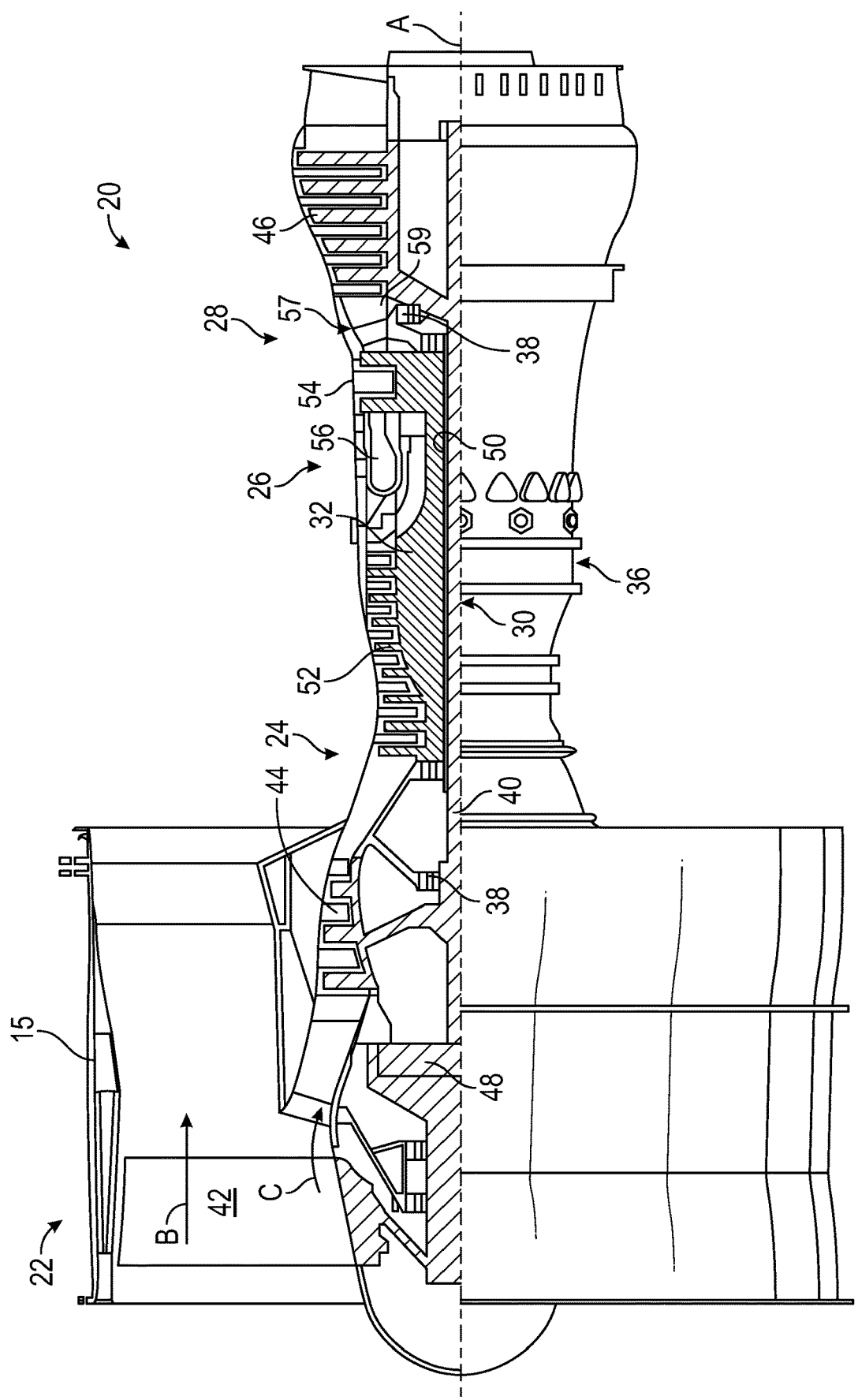
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined in a fan case 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]^0.5. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy and can be a large source of inefficiency in gas turbine engines. Further, transitioning away from hydrocarbon-based engines may be significant advantages, as described herein.

Figure 2:
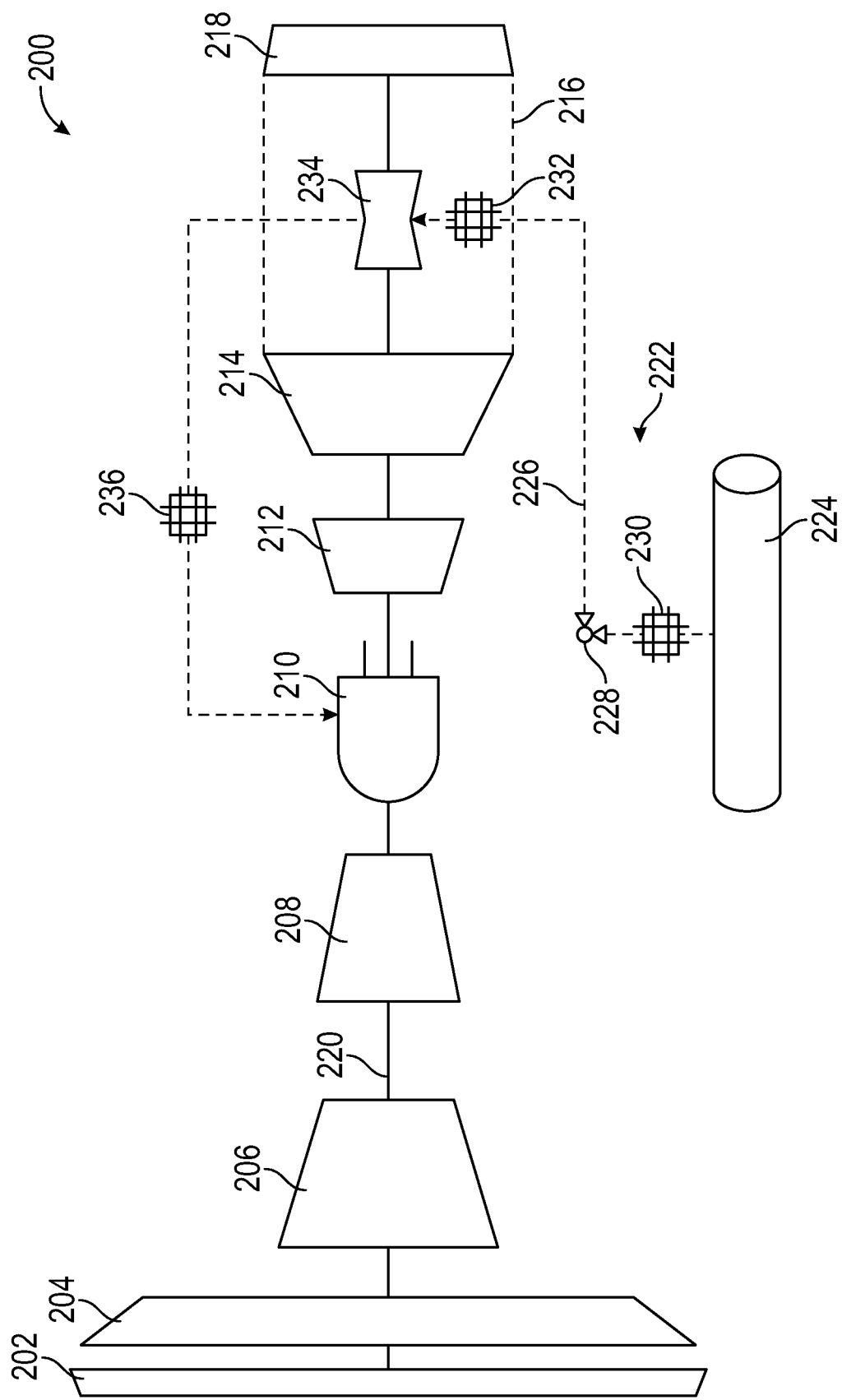
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above but is configured to employ a non-hydrocarbon fuel source, such as a cryogenic fuel, including but not limited to hydrogen. The turbine engine system 200 includes an inlet 202, a fan 204, a low pressure compressor 206, a high pressure compressor 208, a combustor 210, a high pressure turbine 212, a low pressure turbine 214, a core nozzle 216, and an outlet 218. A core flow path is defined through, at least, the compressor 206,208, the turbine 212, 214, and the combustor sections 210. The compressor 206, 208, the turbine 212, 214, and the fan 204 are arranged along a shaft 220.

As shown, the turbine engine system 200 includes a cryogenic fuel system 222. The cryogenic fuel system 222 is configured to supply a cryogenic fuel from a cryogenic fuel tank 224 to the combustor 210 for combustion thereof. In this illustrative embodiment, the cryogenic fuel may be supplied from the cryogenic fuel tank 224 to the combustor 210 through a fuel supply line 226. The fuel supply line 226 may be controlled by a flow controller 228 (e.g., pump(s), valve(s), or the like). The flow controller 228 may be configured to control a flow through the fuel supply line 226 based on various criteria as will be appreciated by those of skill in the art. For example, various control criteria can include, without limitation, target flow rates, target turbine output, cooling demands at one or more heat exchangers, target flight envelopes, etc.

As shown, between the cryogenic fuel tank 224 and the flow controller 228 may be one or more heat exchangers 230, which can be configured to provide cooling to various systems onboard an aircraft by using the cryogenic fuel (e.g., liquid hydrogen) as a cold-sink. Such hydrogen heat exchangers 230 may be configured to warm the hydrogen and aid in a transition from a liquid state to a supercritical fluid or gaseous state for combustion within the combustor 210. The heat exchangers 230 may receive the hydrogen fuel directly from the cryogenic fuel tank 224 as a first working fluid and a component-working fluid for a different onboard system. For example, the heat exchanger 230 may be configured to provide cooling to power electronics of the turbine engine system 200 (or other aircraft power electronics). In other embodiments, the arrangement of the heat exchanger 230 and the flow controller 228 (or a flow controller element, such as a pump) may be reversed. In some such embodiments, a pump, or other means to increase a pressure of the hydrogen sourced from the cryogenic fuel tank 224, may be arranged upstream of the heat exchanger 230. This pumping or pressure increase may be provided to pump the hydrogen to high pressure as a liquid (low power). It will be appreciated that other configurations and arrangements are possible without departing from the scope of the present disclosure.

In some non-limiting embodiments, an optional secondary fluid circuit may be provided for cooling one or more aircraft loads. In this secondary fluid circuit, a secondary fluid may be configured to deliver heat from the one or more aircraft loads to one or more liquid hydrogen heat exchanger. As such, heating of the hydrogen and cooling of the secondary fluid may be achieved. The above described configurations and variations thereof may serve to begin raising a temperature of the hydrogen fuel to a desired temperature for efficient combustion in the combustor 210.

The hydrogen may then pass through an optional supplemental heating heat exchanger 236. The supplemental heating heat exchanger 236 may be configured to receive hydrogen as a first working fluid and as the second working fluid may receive one or more aircraft system fluids, such as, without limitation, engine oil, environmental control system fluids, pneumatic off-takes, or cooled cooling air fluids. As such, the hydrogen will be heated, and the other fluid may be cooled. The hydrogen will then be injected into the combustor 210 through one or more hydrogen injectors, as will be appreciated by those of skill in the art.

When the hydrogen is directed along the flow supply line 226, the hydrogen can pass through a core flow path heat exchanger 232 (e.g., an exhaust waste heat recovery heat exchanger) or other type of heat exchanger. In this embodiment, the core flow path heat exchanger 232 is arranged in the core flow path downstream of the combustor 210, and in some embodiments, downstream of the low pressure turbine 214. In this illustrative embodiment, the core flow path heat exchanger 232 is arranged downstream of the low pressure turbine 214 and at or proximate the core nozzle 216 upstream of the outlet 218. As the hydrogen passes through the core flow path heat exchanger 232, the hydrogen will pick up heat from the exhaust of the turbine engine system 200. As such, the temperature of the hydrogen will be increased.

The heated hydrogen may then be passed into an expansion turbine 234. As the hydrogen passes through the expansion turbine 234 the hydrogen will be expanded. The process of passing the hydrogen through the expansion turbine 234 cools the hydrogen and extracts useful power through the expansion process. Because the hydrogen is heated from a cryogenic or liquid state in the cryogenic fuel tank 224 through the various mechanisms along the flow supply line 226, engine thermals may be improved.

The use of hydrogen fuel in a gas turbine engine (e.g., in combustion) causes the generation of water. In such systems, steam capture may provide benefits, but condenser pressure loss may be prohibitive to capitalize on capturing steam from the exhaust. Embodiments of the present disclosure are directed to condensing steam from an exhaust stream without or with minimal fan duct pressure losses, thus engine efficiency may be maintained while steam capture is provided. Hydrogen-powered engines can produce more than twice the water vapor than Jet-A-powered engines. Such hydrogen-powered systems may have smaller core sizes, making the trade of steam capture more favorable on hydrogen-powered engines. Steam can be condensed with a cold source, such as fan air, but fan air through a large condenser incurs significant drag. Such penalty in drag due to a large condenser could result in a 10-20% overall efficiency penalty.

Figure 3:
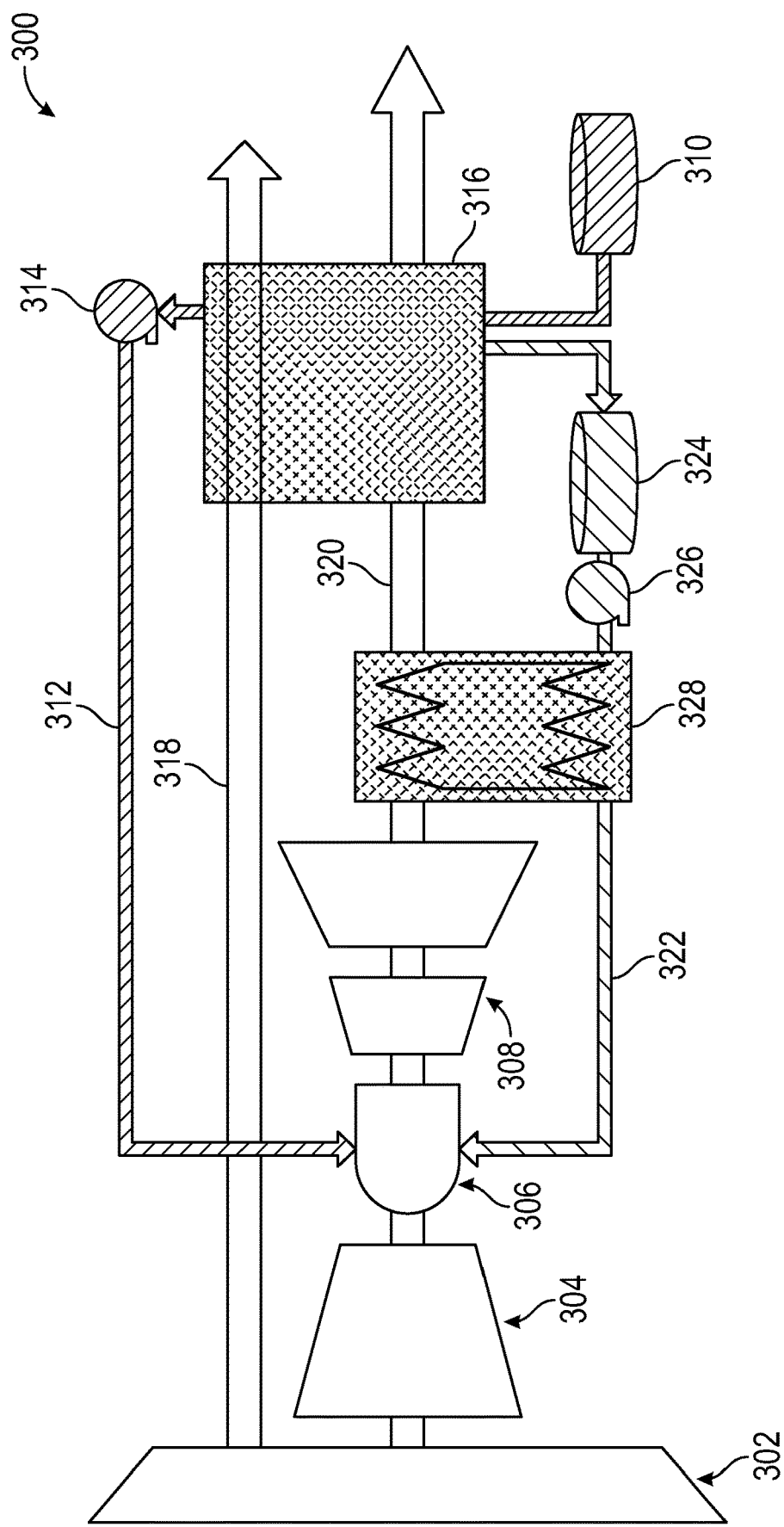
FIG. 3 is a schematic diagram of a hydrogen combustion engine in accordance with an embodiment of the present disclosure.

Turning now to FIG. 3, a schematic diagram of a hydrogen combustion engine 300 in accordance with an embodiment of the present disclosure is shown. The hydrogen combustion engine 300 includes a fan section 302, a compressor section 304, a burner section 306, and a turbine section 308. The compressor section 304, the burner section 306, and the turbine section 308 define a Brayton cycle of the hydrogen combustion engine 300. The burner section 306 includes a combustion chamber configured to mix and burn a fuel, such as hydrogen, the combustion of which generates gaseous water as a byproduct of the combustion operation. The hydrogen fuel is sourced from a cryogenic fuel tank 310. The cryogenic fuel tank 310 is employed to store the hydrogen fuel at cryogenic temperatures in order to reduce the size of the fuel tank. The fuel may be stored as a liquid within the cryogenic fuel tank 310 and converted to a gaseous state prior to injection into the burner section. The fuel is passed through a fuel line 312 by operation of a pump 314 or the like. The fuel may be passed through various heat exchangers, pumps, or the like (not shown) along the fuel line 312. Such components may be used to alter a temperature and/or pressure of the fuel prior to injection into the burner for combustion.

Figure 6:
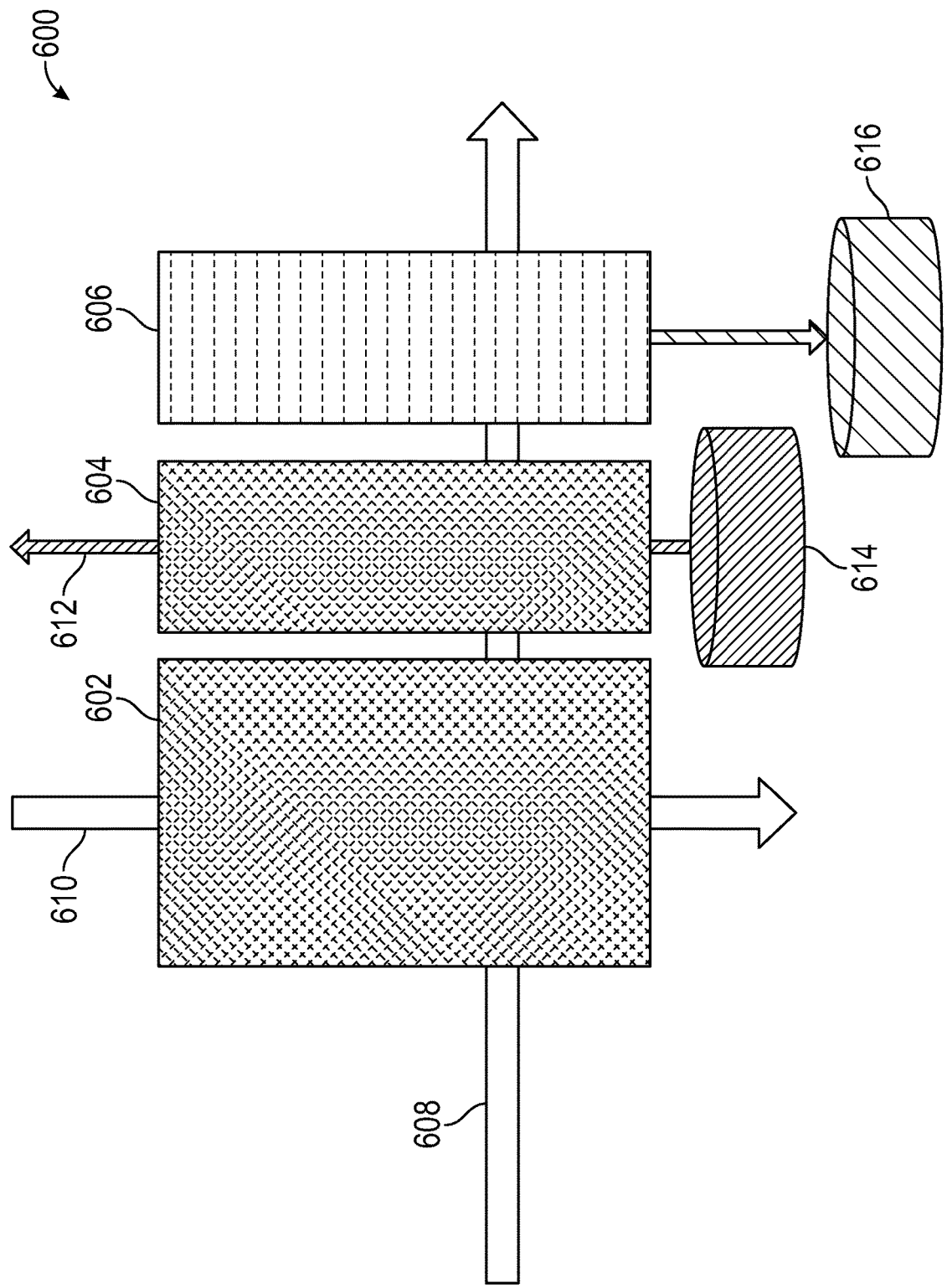
FIG. 6 is a schematic illustration of a condensing assembly in accordance with an embodiment of the present disclosure.

In this illustrative embodiment, the fuel sourced from the cryogenic fuel tank 310 is passed through a condensing assembly 316 arranged downstream, along a core flow 320, from the turbine section 308 and upstream of an exhaust nozzle exit of the hydrogen combustion engine 300. In this embodiment, the condensing assembly 316 includes a condensing heat exchanger. The condensing assembly 316 is arranged to receive two relatively hot fluids (as compared to the cold fuel from the fuel tank 310). As shown, bypass flow 318 is directed from the fan section 302 to the condensing assembly 316 and bypasses the hot portions of the hydrogen combustion engine 300 (e.g., bypasses the burner section 306). The condensing assembly 316 is also arranged to receive relatively hotter air (combustion byproducts) from the core flow 320 that is an exhaust stream from the burner section 306 that is expanded through the turbine section 308. The expansion of the combustion exhaust through the turbine section 308 is used to generate work (e.g., drive rotation of a shaft of the hydrogen combustion engine 300). As such, the condensing assembly 316 is configured to cause a heat exchange between the relatively cold fuel and the relatively hotter core flow 320. The fuel will pick up heat from the core flow 320 and thus the fuel may be heated to appropriate temperatures for burning (e.g., convert from liquid to gaseous state). In some embodiments, the bypass flow 318 may also pick up heat from the core flow 320 (e.g., as shown in FIG. 6). It will be appreciated, and as noted above, that other heat exchangers, pumps, or other mechanisms may be used control the temperature and/or pressure of the fuel prior to injection into the burner section 306 for combustion thereof.

As the fuel is passed through the condensing assembly 316, the cold fuel causes condensation of the air of the exhaust in the core flow 320 within the condensing assembly 316 to generate water which can be condensed from the exhaust from the combustor section 306. For example, as a liquid (cold) hydrogen fuel is passed through the condensing assembly 316 and relatively cool bypass flow 318, the hot temperature of the core flow 320 may be cooled sufficiently to cause water to condense from a vapor form into liquid water. The water from the exhausted core flow 320 may then be condensed out as the combustion exhaust passes through the condensing assembly 316. In some embodiments, a water collector or water separator may be used in combination with the condensing heat exchanger to ensure extraction thereof. The water may then pass through a water line 322 and may be collected within a water storage 324. The liquid water from the water storage 324 may be pumped from the water storage 324 using a water pump 326 and passed through an evaporator 328. The evaporator 328 is a water-core flow heat exchanger that is configured to vaporize the liquid water to generate steam or water vapor. That is, the evaporator 328 is an exhaust heat-heat exchanger. The vaporized water may then be injected into the burner section 306 (e.g., into the combustion chamber thereof) to increase efficiency of the combustion process. In other embodiments, or in combination therewith, a portion of the water (vaporized or otherwise) may be directed into the system for cooling (e.g., at the combustor or turbines).

In the configuration illustrated in FIG. 3, the condensing assembly 316 must be properly sized to allow for sufficient surface area/volume for condensation to occur between the hot core flow 320 and the cooler bypass flow 318 and/or cooler fuel flow in the fuel line 312. That is, the condensing assembly 316 must be sized to allow for both the core flow 320 and the bypass flow 318 to pass therethrough over a sufficient surface area of the condensing assembly 316 such that cooling of the water vapor occurs and the water may be removed from the exhaust core flow 320. As a result, a relatively large condenser may be required which can require excessive weight to be added to the hydrogen combustion engine 300, which can be prohibitive and prevent use of such system in an efficient way.

In view of this, some embodiments of the present disclosure are directed to incorporating an inverse Brayton cycle into the system which can reduction the size of the condensing assembly sufficiently to offset the added weight thereof through generation of extra work from the exhaust flow. In accordance with embodiments of the present disclosure, an extra compression step is implemented prior to exhausting the core stream on an engine with a condenser and evaporator in the core stream. The extra compression step causes a higher turbine expansion ratio, and additional net work to be produced due to the heat rejection between the turbine and an exhaust compressor. Additionally, due to condensation ahead of the exhaust compressor, the mass flow in the compressor is less than in the turbine and additional net work is created. Furthermore, because the core stream is significantly cooled with the additional expansion, less cooling is required from fan air and therefore less fan duct pressure loss incurred due to the condenser.

Figure 4:
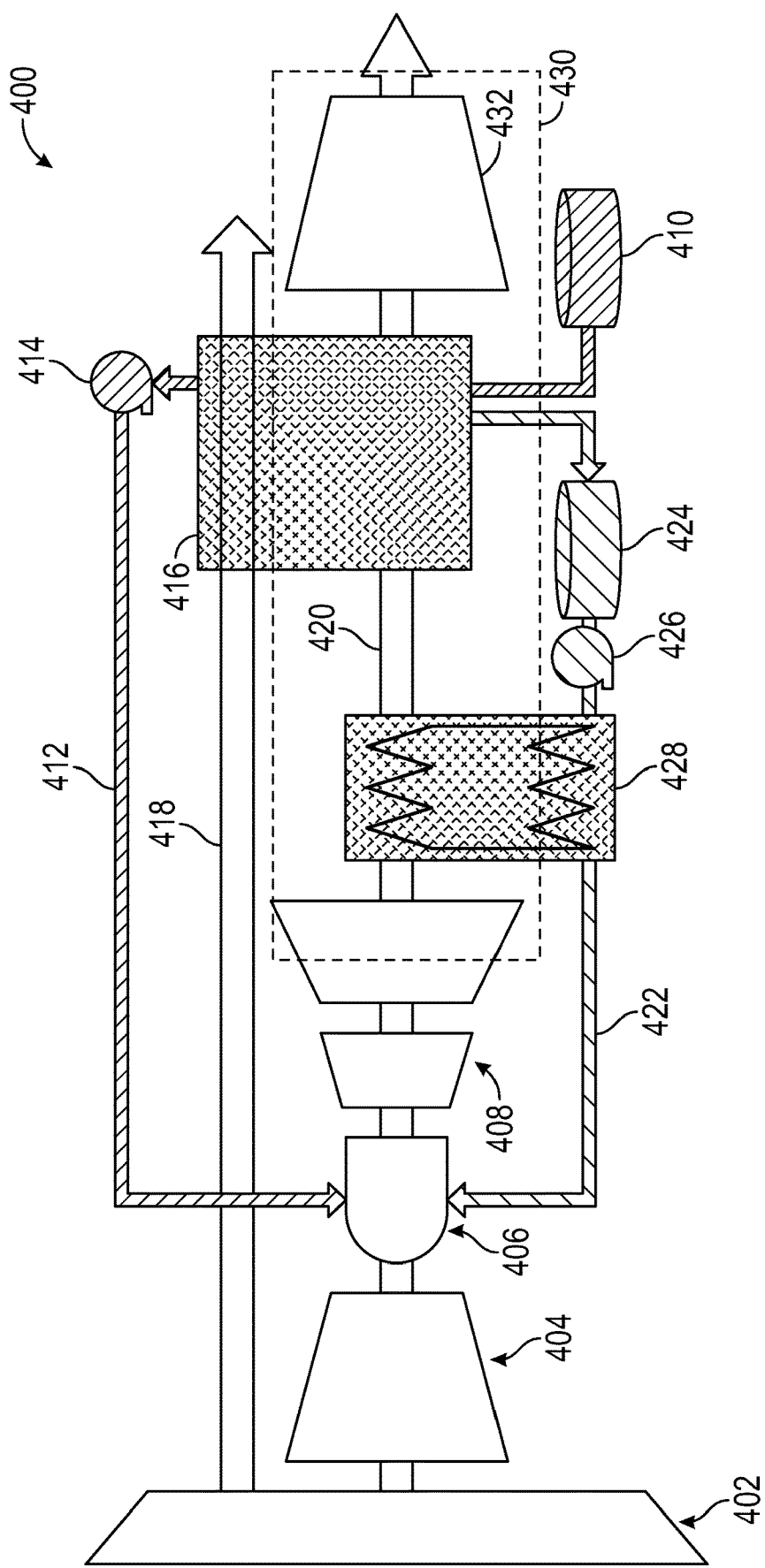
FIG. 4 is a schematic diagram of a hydrogen combustion engine in accordance with an embodiment of the present disclosure.

Turning now to FIG. 4, a schematic diagram of a hydrogen combustion engine 400 in accordance with an embodiment of the present disclosure is shown. The hydrogen combustion engine 400 includes a fan section 402, a compressor section 404, a burner section 406, and a turbine section 408. The compressor section 404, the burner section 406, and the turbine section 408 define a Brayton cycle of the hydrogen combustion engine 400. The burner section 406 includes a combustion chamber configured to mix and burn a fuel, such as hydrogen. The hydrogen fuel is sourced from a cryogenic fuel tank 410 which stores the hydrogen fuel as a liquid. The liquid fuel is passed through a fuel line 412 by operation of a pump 414 or the like and is thermally treated to transition the fuel from a liquid to a gaseous state for combustion. The fuel may be passed through various heat exchangers, pumps, or the like (not shown) along the fuel line 412. Such components, in combination with a condensing assembly 416, may be used to alter a temperature and/or pressure of the fuel prior to injection into the burner for combustion. In this embodiment, the condensing assembly 416 includes a condensing heat exchanger.

In this illustrative embodiment, the fuel sourced from the cryogenic fuel tank 410 is passed through the condensing assembly 416 arranged downstream from the turbine section 408 and upstream of an exhaust nozzle exit of the hydrogen combustion engine 400 along a core flow 420. The condensing assembly 416 is arranged to receive two relatively hot fluids (as compared to the cold fuel from the fuel tank 410). As shown, bypass flow 418 is directed from the fan section 402 to the condensing assembly 416 and bypasses the hot portions of the hydrogen combustion engine 400 (e.g., bypasses the burner section 406). The condensing assembly 416 is also arranged to receive relatively hotter air from the core flow 420 that is an exhaust stream from the burner section 406 that is expanded through the turbine section 408. As such, the condensing assembly 416 is configured to cause a heat exchange between the relatively cold fuel and the relatively hotter bypass flow 418 and the core flow 420. The fuel will pick up heat from these two flows 418, 420 and thus the fuel may be heated to appropriate temperatures for burning (e.g., convert from liquid to gaseous state). It will be appreciated, and as noted above, that other heat exchangers, pumps, or other mechanisms may be used control the temperature and/or pressure of the fuel prior to injection into the burner section 406 for combustion thereof.

As the exhaust from the burner section 406 is passed through the condensing assembly 416, water vapor within the exhaust may be condensed to generate liquid water. The water may then pass through a water line 422 and may be collected within a water storage 424. The liquid water from the water storage 424 may be pumped from the water storage 424 using a water pump 426 and passed through an evaporator 428. The evaporator 428 is a water-core flow heat exchanger that is configured to vaporize the liquid water to generate steam or water vapor. That is, the evaporator 428 is an exhaust heat-heat exchanger. The vaporized water may then be injected into the burner section 406 (e.g., into the combustion chamber thereof) to increase efficiency of the combustion process. Alternatively, or in combination, a portion of the water may be used for cooling purposes, as will be appreciated by those of skill in the art.

In this embodiment, the hydrogen combustion engine 400 includes an inverse Brayton cycle 430 arranged downstream of the burner section 406 along the core flow 420. The inverse Brayton cycle 430 includes a portion of the turbine section 408, the evaporator 428, the condensing assembly 416, and an exhaust compressor 432. The exhaust compressor 432 is configured to compress the air that exits the condensing assembly 416 prior to expelling such air through an engine nozzle. The extra compression step at the exhaust compressor 432 causes a higher turbine expansion ratio at the turbine section 408. As a result, additional work may be produced due to the heat rejection between the turbine section 408 and the exhaust compressor 432. Additionally, due to condensation ahead of the exhaust compressor 432 within the condensing assembly 416, the mass flow in the exhaust compressor 432 is less than in the turbine section 408 and additional work is created. Additionally, because the core flow 420 is significantly cooled with the additional expansion in the turbine section 408, less cooling is required from fan air (e.g., bypass flow 418) and therefore less fan duct pressure loss may be incurred due to the condensing assembly 416.

Due to the inclusion of the exhaust compressor 432 and the formation of the inverse Brayton cycle 430, heat rejection in the evaporator 428 causes extra expansion in the turbine section 408 that can generate additional work (e.g., imparted to a core shaft or other shaft). In some configurations, the additional work may be imparted to the exhaust compressor 432 through a shared or joint shaft that mechanically couples the turbine section 408 with the exhaust compressor 432. Due to the condensing assembly 416 and extraction of the water in the exhaust flow, a mass flow through the exhaust compressor 432 is less than a mass flow through the turbine section 408. As a result, a significant power benefit may be realized: mdot(delta h)_turbine−mdot (delta h) compressor. Furthermore, additional turbine expansion (below ambient pressure) in the turbine section 408 can reduce the cooling needed from fan air (e.g., bypass flow 418), and therefore the pressure loss associated with the inclusion of a condenser may be mitigated.

Although illustratively shown with the exhaust compressor 432 arranged in line with the Brayton cycle components, such configurations are not to be limiting. In some such embodiments, the exhaust compressor 432 may be connected to the main engine shaft. However, it may be advantageous to decouple the exhaust compressor from the primary shaft rotation. As such, in some embodiments, a clutch or gearing assembly may be used to control or achieve different rotational speeds of the exhaust compressor as compared to the components of the Brayton cycle. Further, in some embodiments, the exhaust compressor may be independently driven, such as through electrical power using a battery, generator, or the like. In such embodiments, the rotation of the exhaust compressor may be completely independent from the rotation of the turbine section. Accordingly, the illustrative schematic diagram is not intended to be limiting, but rather is provided for illustrative and explanatory purposes.

Figure 5:
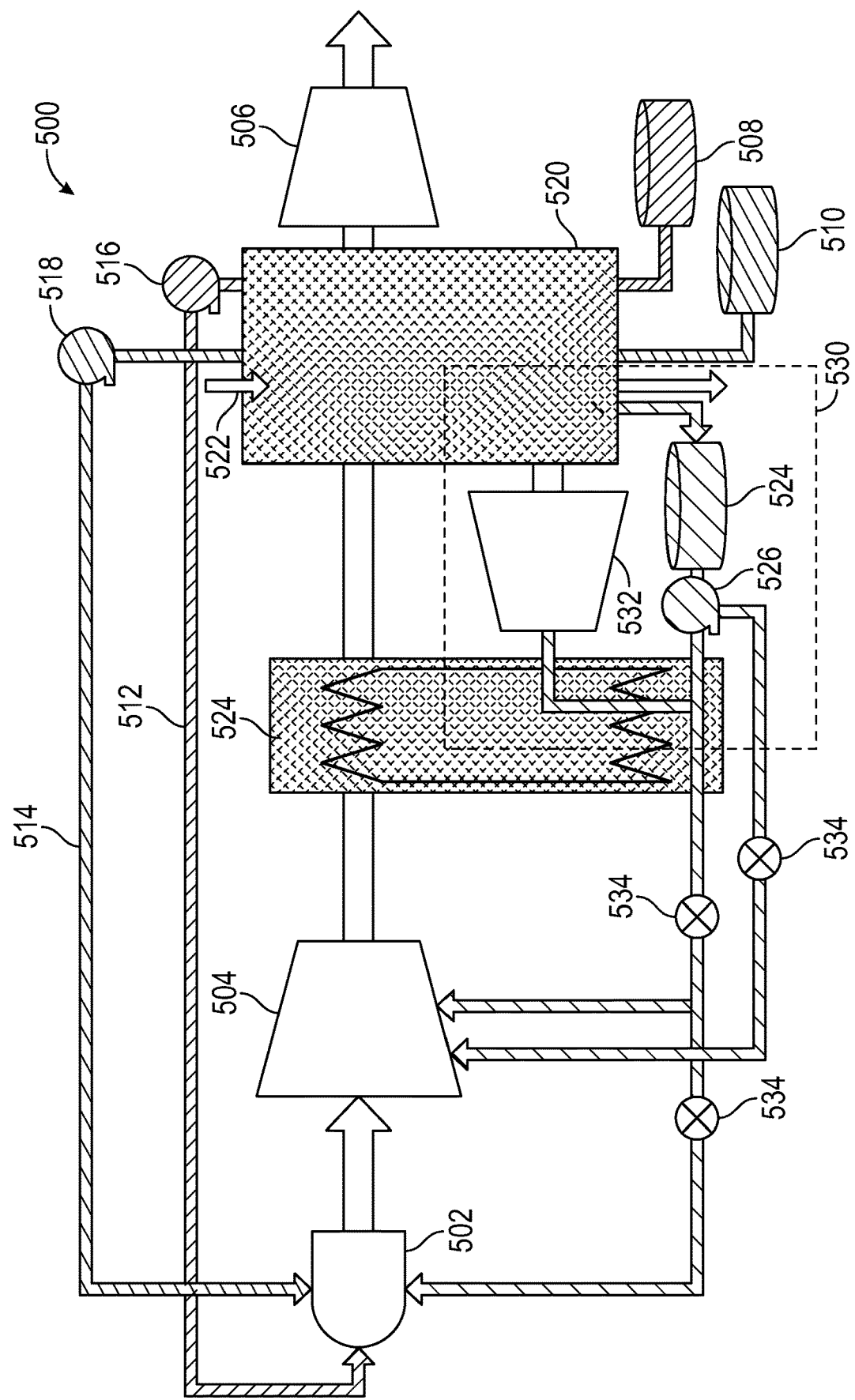
FIG. 5 is a schematic diagram of a hydrogen combustion engine in accordance with an embodiment of the present disclosure.

Turning now to FIG. 5, a schematic diagram of a hydrogen combustion engine 500 in accordance with an embodiment of the present disclosure is shown. The hydrogen combustion engine 500 includes a burner section 502 and a turbine section 504. An exhaust compressor 506 is provided downstream of the turbine section 504 to define an inverse Brayton cycle in the hydrogen combustion engine 500. The burner section 502 includes a combustion chamber configured to mix and burn a fuel, such as hydrogen and oxygen (e.g., no ambient air flow as used in the embodiment of FIG. 4). Hydrogen fuel is sourced from a first fuel tank 508 which stores a hydrogen fuel as a liquid and oxygen fuel is sourced from a second fuel tank 510 which stores an oxygen fuel as a liquid. The liquid fuel is passed through respective fuel lines 512, 514 by operation of respective pumps 516, 518 or the like and is thermally treated to transition the fuels from a liquid to a gaseous state for combustion within the burner section 502. It will be appreciated that the cold/liquid fuel may be passed through various heat exchangers, pumps, or the like (not shown) along the fuel lines 512, 514. Such components, in combination with a condensing assembly 520, may be used to alter a temperature and/or pressure of the fuel prior to injection into the burner for combustion.

In this embodiment, the condensing assembly 520 is configured to operate similar to that described above. Specifically, the condensing assembly 520 is configured to employ cold fuel and/or cool air 522 (e.g., ambient air, ram air, etc.) to provide a heat sink for combustion exhaust gases and condense water vapor from the exhaust gases within the condensing assembly 520. The extracted liquid water may be collected within a water storage 524. The liquid water from the water storage 524 may be pumped from the water storage 524 using a water pump 526 and passed through an evaporator 528. The evaporator 528 is a water-core flow heat exchanger that is configured to vaporize the liquid water to generate steam or water vapor. That is, the evaporator 528 is an exhaust heat-heat exchanger arranged downstream from the burner section 502 and the turbine section 504 and configured to impart heat into the liquid water within the evaporator 524. The vaporized water may then be injected into the burner section 506 (e.g., into the combustion chamber thereof) to increase efficiency of the combustion process and/or into the turbine section 504 which can increase condensation and/or begin condensation of the combustion output prior to the downstream condensing assembly 520 and/or compressor 506. Further, such water may be supplied for the purpose of cooling components of the system.

In this configuration, a Rankine bottoming cycle 530 is employed that includes a Rankine turbine 532. In this configuration, the water that is condensed within the condensing assembly 520 may be directed to the water storage 524 or through the Rankine turbine 532. A set of valves 534 may be used to control where the water is injected back into the hydrogen combustion engine 500 (e.g., at the burner section 502 or at the turbine section 504).

Turning now to FIG. 6, a schematic illustration of a condensing assembly 600 in accordance with an embodiment of the present disclosure is shown. The condensing assembly 600 may be used with an inverse Brayton cycle and/or hydrogen burning engine, as shown and described above. The condensing assembly 600, in this embodiment, if formed of a set of heat exchangers arranged in series and configured to cool a core airflow (e.g., combustion exhaust) and extract water from such core airflow. As shown, the condensing assembly 600 includes a first heat exchanger 602, a second heat exchanger 604, and a water separator 606. The heat exchangers 602, 604 and water separator 606 are arranged in series along a core flow 608.

The first heat exchanger 602 may be configured as a core flow-to-air heat exchanger. The core flow 608 (e.g., combustion exhaust) is passed through the first heat exchanger 602 as a first working fluid and a cooling airflow 610 is passed through the first heat exchanger 602 as a second working fluid. In this configuration, the cooling airflow 610 operates as a first heat sink to cool the core flow 608. The air of the cooling airflow 610 may be bypass air, fan duct air, ram air, or other air sourced, for example, from ambient.

Downstream from the first heat exchanger 602 along the core flow 608 is the second heat exchanger 604. The core flow 608 is passed through the second heat exchanger 604 as a first working fluid and a fuel flow 612 is passed through the second heat exchanger 604 as a second working fluid. In this configuration, the fuel flow 612 is sourced from a cryogenic fuel tank 614 and may include a cold or cryogenic fuel passing therethrough. This cold fuel further cools the core flow 608 while simultaneous raising the temperature of the cold fuel (e.g., cold fuel is a heat sink) and the fuel may be warmed in preparation for injection into a combustor or burner, as described above.

As the cooled core flow 608 exits the second heat exchanger 604, the core flow 608 is passed into the water separator 606 where liquid water is extracted from the core flow 608. The liquid water may be directed into a water storage 616. The water storage 616 may be fluidly connected to one or more locations on a hydrogen burning engine for the purpose of water injection (e.g., in the form of steam) into the core flow 608 upstream of the first heat exchanger 602 (e.g., in a burner section or turbine section). Although illustratively shown with the first and second heat exchangers 602, 604 as separate/distinct structures, such configuration is not to be limiting. For example, in some embodiments, rather than two separate heat exchangers/structures, a single unitary structure with distinct flow paths therethrough (e.g., for core flow 608, cooling airflow 610, and fuel flow 612) may be employed without departing from the scope of the present disclosure. Further, in some embodiments, a second fuel flow may be passed through an additional heat exchanger or additional flow path through a single structure configuration. Such second fuel may be liquid oxygen, such as shown in the embodiment of FIG. 5. In such configurations, the oxygen path may be arranged upstream of a hydrogen path relative to a direction of the core flow 608 (e.g., as schematically shown in FIG. 5).

In accordance with embodiments of the present disclosure, the combination of the evaporator and condenser, depending on the engine configuration, can extract up to 100% of the water content from the burner exhaust. In some embodiments, the water extraction may be between 0% and 100% of the water content from the burner exhaust, such as in a hydrogen burning engine that includes an onboard oxidizer (e.g., hydrogen combustion engine 500 of FIG. 5). In the case of 100% water extraction/rejection, the mass flow of the core flow path would be reduced to zero, as the entirety of the core flow in such systems is water (i.e., combusted hydrogen and oxygen). This is because the combustion reaction between the hydrogen and oxygen results in water generation, with no other byproducts. As a result, the entire mass (water content) may be rejected from the core stream. In contrast, in a conventional gas turbine engine (e.g., burning jet fuel or the like), the mass flow rejection may be between 0% and 50%, inclusive, as the combustion byproducts consist of more than merely water, and thus even 100% removal of water content will result in a remainder of mass flow of other constituents. By removing the water content from the burner exhaust, the mass flow is reduced prior to passing through the exhaust compressor. In some such embodiments, the bulk of the temperature change of the exhaust flow may be achieved through the evaporator which incurs substantial heat pickup in liquid water that is vaporized and then reinjected into the system as steam. The reduced temperature burner exhaust may then pass into and through the condensing assembly for water extraction (e.g., through further cooling as described above).

Figure 7:
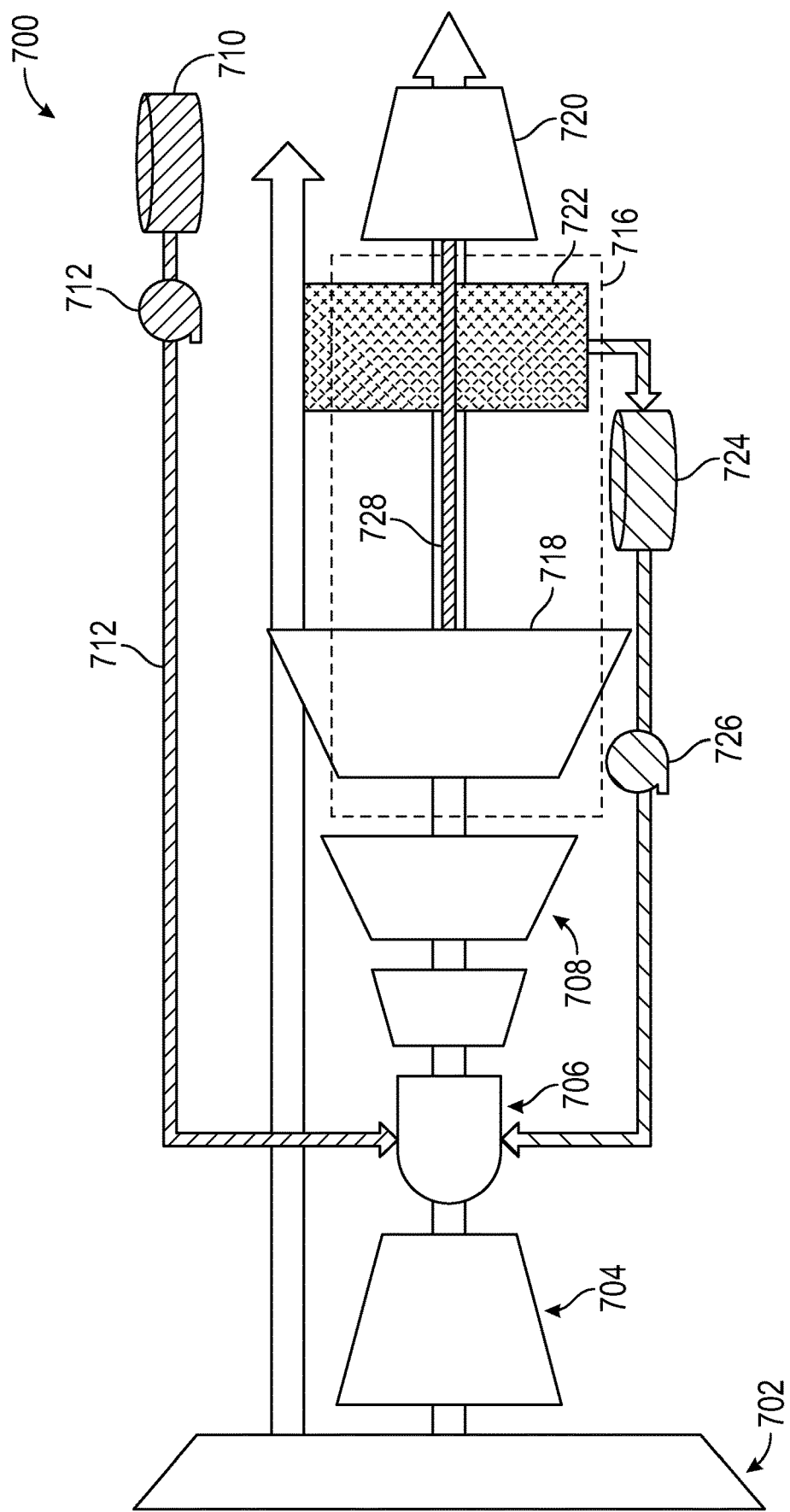
FIG. 7 is a schematic diagram of a combustion engine in accordance with an embodiment of the present disclosure.

In some embodiments of the present disclosure, the condensing assembly may take the form of a condensing turbine rather than a condensing heat exchanger. For example, turning now to FIG. 7, a schematic diagram of a combustion engine 700 is shown. The combustion engine 700, in some embodiments, may be a conventional gas turbine engine configured to combust conventional fuels, such as jet fuel. In other embodiments, the combustion engine 700 may be a hydrogen burning engine, that is air-breathing (e.g., using ambient air for oxygen source) or non-air-breathing (e.g., onboard hydrogen and oxygen supplies).

The combustion engine 700 includes a fan section 702, a compressor section 704, a burner section 706, and a turbine section 708. The compressor section 704, the burner section 706, and the turbine section 708 define a Brayton cycle of the combustion engine 700. Further, the sections 704, 706, 708 define an engine core with a core flow path passing therethrough. The burner section 706 includes a combustion chamber configured to mix and burn a fuel, such as hydrogen or jet fuel, the combustion of which generates gaseous byproducts of the combustion operation, including water. The fuel is sourced from a fuel tank 710, such as a convention fuel tank or cryogenic fuel tank. The fuel is passed through a fuel line 712 by operation of a pump 714 or the like. The fuel may be passed through various heat exchangers, pumps, or the like (not shown) along the fuel line 712. Such components may be used to alter a temperature and/or pressure of the fuel prior to injection into the burner for combustion and/or provide a heat sink for other systems/components of the combustion engine 700 or associated aircraft.

In this illustrative configuration, the combustion engine 700 includes a condensing assembly 716. Unlike the above described embodiments, the condensing assembly 716 does not include a condenser heat exchanger, but rather includes a condensing turbine 718. In this configuration, the condensing turbine 718 is arranged downstream from the turbine section 708 of the engine core. The combustion byproducts will be expanded within the turbine section 708 of the engine core, and then passed into the condensing turbine 718 of the condensing assembly 716. In the condensing turbine 718, the combustion byproducts are expanded further and exhausted toward an exhaust compressor 720. The condensing turbine 718 will reduce the pressure of the combustion byproducts to relatively low pressures, such as sub-ambient pressure, and this reduced pressure core flow causes condensation of water vapor within the core flow.

The condensed water within the core flow may be passed into a water collector 722 that is arranged upstream of the exhaust compressor 720. The water collector 722 may be configured to extract the condensed water from the core flow (e.g., steam or water vapor) and thus reject mass flow from the core flow. As a result, the mass flow of the core flow that enters the exhaust compressor 720 will have lower mass flow than that upstream of the condensing turbine 718. The extracted water may be directed into a water storage 724 for use onboard the aircraft. For example, the water within the water storage 724 may be pumped, using a water pump 726, and injected into a core flow, such as at the burner section 706 and/or the turbine section 708. The condensing turbine 718 and the exhaust compressor 720 may be coupled to and operably driven by a main engine shaft. However, as illustrated, the condensing turbine 718 and the exhaust compressor 720 may be operably driven by a condensing system shaft 728. The condensing system shaft 728 may be driven using an electric motor, may be driven by rotational energy driven in part by a main engine shaft, or may be driven in a manner that is separate and independent from the main engine.

As discussed above, an evaporator may be arranged upstream of the condensing assembly. In configurations that employ a condensing turbine, the evaporator may be arranged upstream of such condensing turbine to ensure that sufficient temperature combustion byproduct is available to achieve the evaporation. In other embodiments, an evaporator may be split such that a first evaporator is arranged upstream from the condensing turbine and a second evaporator is arranged downstream from the condensing turbine. The selection of position and number of evaporators may depend on how cold the core flow temperature is when it exits the condensing turbine. In some embodiments, work may be recovered through operation of a condensing turbine and exhaust compressor, such as when arranged upon a common shaft. In some such embodiments, if operation of the coupled system is modulated (e.g., using a variable stator or electric drive), an effective mechanism to control the amount of condensation in the condensing turbine as altitude changes during a flight operation may be provided.

As discussed above, the exhaust compressor may be coupled to the main engine shaft. However, such driving mechanism (e.g., the main engine shaft) is not the only mechanism for driving an exhaust compressor. For example, in some embodiments, the power source for driving the exhaust compressor may be independent from the turbine and shaft of the main engine. In some such configurations, the power source may be an electric motor. Such electric motors may be configured to power the exhaust compressor to control an engine parameter, such as by creating turbine exit conditions suitable to condensation in a given flight regime.

It will be appreciated that the above described embodiments disclosure various configurations of hydrogen and non-hydrogen burning engines. In accordance with embodiments of the present disclosure, both hydrogen burning and non-hydrogen burning engines may employ the configurations and arrangements disclosed herein. For example, a non-hydrogen burning engine can include a condenser, evaporator, or the like, as desired. Further, hydrogen burning engines may include a condensing turbine rather than (or in combination with) a condenser heat exchanger. The illustrative and descriptive embodiments are merely for illustrative and explanatory purposes, and those of skill in the art will appreciate that features from one embodiment may be included in the architecture of another embodiment. That is, the individual disclosed embodiments/architectures are not intended to be limiting to the specific architecture described, but rather is provided to explain various aspects of the present disclosure.

In accordance with embodiments of the present disclosure, mass rejection is achieved through condensation of water from a core flow through a combustion engine. In view of this, the disclosed condensing assemblies (e.g., condenser heat exchangers, condensing turbine, combinations thereof, etc.) in combination with a water separator/collector, form a mass rejection system. The mass rejection by way of water removal allows for the inclusion of an exhaust compressor, as described herein.

Advantageously, in accordance with embodiments of the present disclosure, the exhaust compressor provides for sub-atmospheric operation of the condensing assemblies described herein. As a result, in some embodiments, a higher expansion ratio of the turbine of the inverse Brayton cycle may be achieved. This higher expansion ratio at the turbine can generate work by the system, which can compensate for the increased drag that is present when a condenser is employed. The extra compression step causes a higher turbine expansion ratio, and additional net work to be produced due to the heat rejection between the turbine and the exhaust compressor. Additionally, due to condensation ahead of the exhaust compressor (e.g., in a condenser and/or from turbine expansion), the mass flow in the exhaust compressor is less than in the turbine and additional net work is created. Additionally, because the core stream is significantly cooled with the additional expansion at the turbine, less cooling is required from cooling air sources (e.g., fan air, ram air, ambient air, etc.) and therefore less pressure loss may be incurred due to the inclusion of a condenser for extracting water from the core exhaust flow.

Advantageously, in some embodiments of the present disclosure, mass flow rejection is provided where a portion of the content of a combustion reaction is removed from a core flow. In accordance with embodiments of the present disclosure, the mass rejection is of water content from the combustion byproducts, downstream of the burner section of the engine. Mass rejection reduces the penalty for over expansion and re-compression, as the compressor must compress less mass than the turbine expands. As such, engine efficiencies may be realized (e.g., less weight, more efficient operation, additional power generation, etc.). Further, advantageously, by removing such water from the air flow through the system, erosion of components that results from water contact or water exposure may be reduced or eliminated. This extracted water can be captured and reused for beneficial effect within the system, as described herein. Advantageously, by removing water droplets from the flow, such droplets will not impact the downstream engine components, such as the exhaust compressor, and thus erosion of the turbines, blades, or other structures/components of the exhaust compressor may be reduced and/or eliminated.

As used herein, the terms "about" and "substantially" are intended to include the degree of error associated with measurement of the particular quantity based upon the equipment available at the time of filing the application. For example, "about" or "substantially" may include a range of ±8%, or 5%, or 2% of a given value or other percentage change as will be appreciated by those of skill in the art for the particular measurement and/or dimensions referred to herein. The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An aircraft engine, comprising:
  a turbine engine comprising a compressor section, a burner section, and a turbine section arranged along a shaft, with a core flow path through the turbine engine such that exhaust from the burner section passes through the turbine section;
  a condensing assembly arranged downstream of the turbine section of the turbine engine along the core flow path; and
  an exhaust compressor arranged downstream of the condensing assembly along the core flow path,
  wherein the condensing assembly is configured to reduce a mass flow of the exhaust compressor by condensing water vapor from a core flow exhausted from the turbine section and removing liquid water from the core flow.

2. The aircraft engine of claim 1, wherein the burner section is configured to combust hydrogen fuel therein.

3. The aircraft engine of claim 2, wherein a fuel flow path of the hydrogen fuel passes through the condensing assembly prior to injection of the hydrogen fuel into the burner section.

4. The aircraft engine of claim 1, wherein the condensing assembly comprises a condensing turbine.

5. The aircraft engine of claim 1, wherein the condensing assembly comprises a heat exchange condenser.

6. The aircraft engine of claim 1, wherein the condensed water vapor is stored in a water storage.

7. The aircraft engine of claim 6, further comprising a water pump configured to pump water from the water storage to at least one of the burner section or the turbine section of the turbine engine.

8. The aircraft engine of claim 6, further comprising at least one valve configured to selectively direct a portion of the condensed water vapor into the burner section or the turbine section as liquid water or steam.

9. The aircraft engine of claim 1, further comprising an evaporator arranged downstream from the turbine section along the core flow path.

10. The aircraft engine of claim 9, wherein the condensed water vapor is directed through the evaporator to generate steam.

11. The aircraft engine of claim 10, wherein the steam is injected into at least one of the burner section and the turbine section of the turbine engine.

12. The aircraft engine of claim 1, further comprising a fan and a bypass duct configured to direct bypass air past the compressor section, the burner section, and the turbine section.

13. The aircraft engine of claim 12, wherein the bypass air is directed through a portion of the condensing assembly to cause condensing of water from an exhaust from the burner section.

14. The aircraft engine of claim 1, wherein the condensing assembly comprises (i) a combustor exhaust-to-air heat exchanger and (ii) a combustor exhaust-to-fuel heat exchanger.

15. The aircraft engine of claim 1, further comprising a water separator arranged downstream from the condensing assembly.

16. The aircraft engine of claim 1, wherein the exhaust compressor is operated at sub-ambient pressures.

17. The aircraft engine of claim 1, further comprising a Rankine bottoming cycle having a Rankine turbine, wherein at least a portion of the condensed water vapor is directed through the Rankine turbine.

18. The aircraft engine of claim 1, wherein the condensing assembly comprises three cooling flow paths comprising: (i) a cooling air flow path, (ii) an oxygen fuel flow path, and (iii) a hydrogen fuel flow path.

19. The aircraft engine of claim 18, wherein an exhaust from the burner section passes through the condensing assembly to sequentially thermally interact with the cooling air flow path, then the oxygen fuel flow path, and then the hydrogen fuel flow path to condense water from the exhaust of the burner section.

20. The aircraft engine of claim 1, wherein the condensing assembly is configured to extract up to 100% of the water content from an exhaust from the burner section.

* * * * *